Feb. 11, 1969 A. R. MAXEY 3,426,976

TAPE TRANSPORT APPARATUS WITH LOCKING MECHANISM

Filed March 24, 1967

Sheet 1 of 4

INVENTOR.
ALEXANDER R. MAXEY

BY
FOWLER, KNOBBE & MARTENS
ATTORNEYS.

INVENTOR.
ALEXANDER R. MAXEY
BY
FOWLER, KNOBBE & MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

United States Patent Office 3,426,976
Patented Feb. 11, 1969

3,426,976
TAPE TRANSPORT APPARATUS WITH LOCKING MECHANISM

Alexander R. Maxey, Newark, Calif., assignor, by mesne assignments, to Alan R. Fowler, Orange, Calif., as trustee Filed Mar. 24, 1967, Ser. No. 625,679
U.S. Cl. 242—55.12 18 Claims
Int. Cl. G11b *15/44;* B65h *25/22, 59/38*

ABSTRACT OF THE DISCLOSURE

A tape transport apparatus includes a selectively engageable locking mechanism operably connected to a tape compliance arm for locking the tape supply hub against rotation in the tape feeding direction when the transport apparatus is not in operation. The locking mechanism engages responsive to movement of the compliance arm a preselected distance in taking up slack in the tape coming off the supply reel and disengages responsive to movement of the compliance arm in the opposite direction as the tape tightens. The compliance arm is able to take up tape slack and relieve tape tension even with the locking mechanism engaged. The capstan and take-up reels are locked against reverse rotation by one-way clutches.

*Background of the invention*

Portable tape recorders are often subjected to jars and vibrations which cause the tape hubs to rotate when the transport mechanism is not in operation. The friction brakes generally employed for releasably resisting rotation during operation remain in effect when the transport mechanism is shut off, but such friction brakes are not sufficient to resist rotation from the jiggling action caused by severe vibrational loads. Thus, for example, if a typical prior art recorder is carried in a back pack or transported in an airplane when loaded with tape and not in operation, the reels may rotate or migrate and spill loose tape. The loose tape often will tangle and may be ruined.

This can be a particular problem, for example, in a back-pack video tape recorder which is used for on-the-scene recording of news events. The tape cannot be unthreaded between recording sequences since a number of short sequences may be recorded at a single event with the recorder being vibrated and jarred between sequences as it is carried about.

Therefore, there is a need for a tape transport mechanism which includes a device for locking the reels against rotation in the direction which would spill tape when the transport mechanism is not in operation. Such a locking device should be automatically engaged if the supply reel migrates when the transport is turned off and should be automatically released when the transport is turned on. In addition, the lock should be sufficient to prevent rotation even under very severe vibrational loads.

*Summary of the invention*

This invention provides a tape transport including a locking mechanism which is automatically engaged to lock the supply reel against rotation in the forward direction if the supply reel migrates forward when the transport is turned off. Moreover, the take-up reel is locked against rotation in the reverse direction to prevent tape spillage.

Broadly, the invention includes a supply hub rotatably mounted to feed tape from a reel, a take-up hub rotatably mounted to receive tape fed from the supply reel, and means which are engaged responsive to a pre-selected slack in the tape to lock the supply reel against rotation in the tape feeding direction. In the preferred embodiment the lock is engaged by movement of the supply tape compliance arm. In normal operation, the supply compliance arm pivots to take up a slack and relieve tension in the tape coming off the supply reel. If the supply reel rotates when the take-up reel is not in operation, the supply compliance arm pivots beyond its normal operating sector to take-up the slack and throws the locking mechanism into engagement. When the transport is turned on again, the capstan pulls tape off the supply reel thereby pivoting the compliance arm back to its normal operating sector and releasing the locking mechanism. Tape spillage off the take-up reel is prevented by a one-way clutch which locks the take-up hub against reverse rotation.

The supply compliance arm is connected to the locking mechanism through a resilient joint which permits the arm to pivot beyond the position at which it engages the locking mechanism in order to take-up any further slack in the tape. The compliance arm also regulates the braking force of a friction brake on the supply hub, but a spring-loaded connector between the compliance arm and the brake permits further movement of the arm after the brake is fully loaded.

These and other features, objects and advantages of this invention will be apparent from the following detailed description when read with reference to the accompanying drawings.

*Description of the preferred embodiments*

Figure 1:
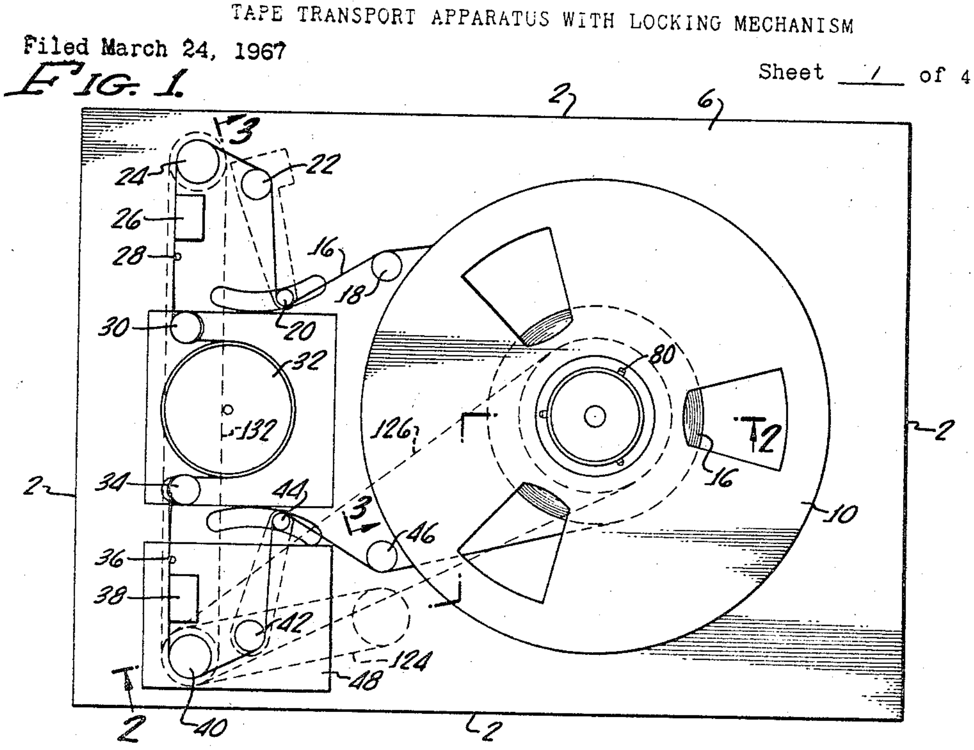
FIGURE 1 is a plan view of an exemplary video tape recorder embodying this invention.
Figure 2:
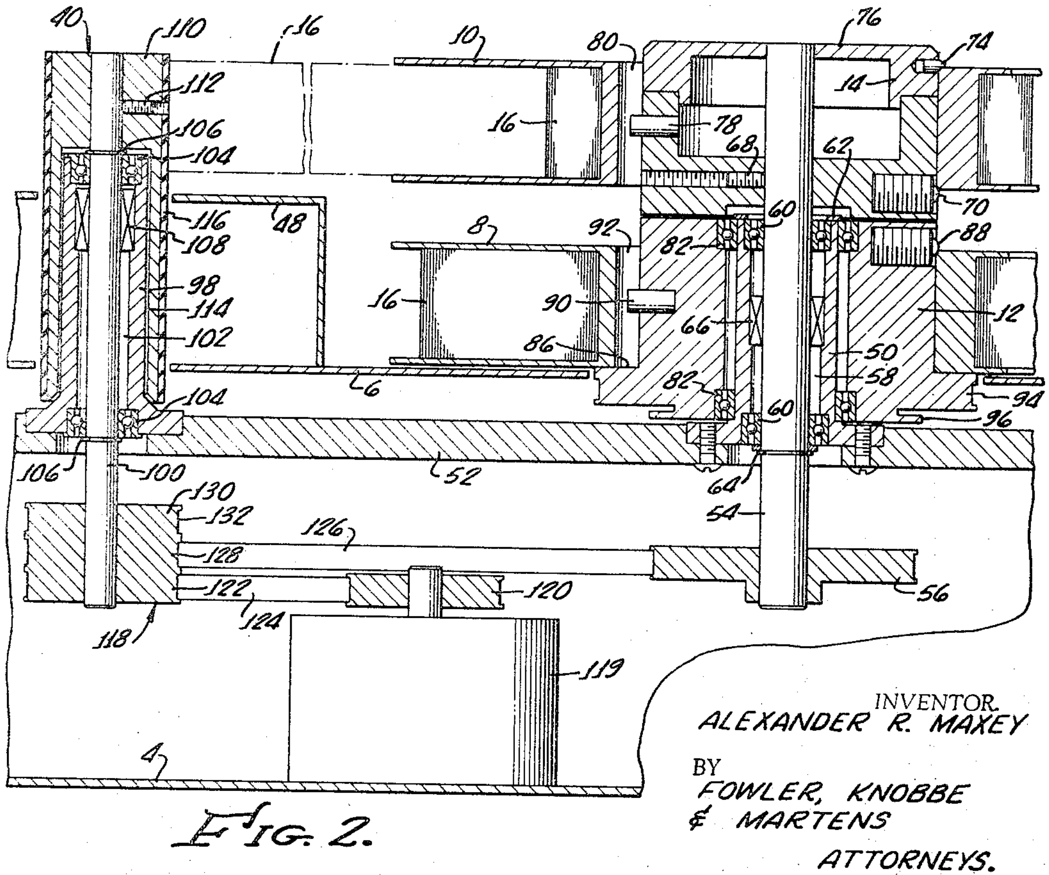
FIGURE 2 is a vertical section taken generally along lines 2—2, of FIGURE 1, illustrating the structure of an exemplary supply hub, take-up hub, take-up capstan and drive assembly.

Referring to FIGURES 1 and 2, an exemplary video tape recorder includes a rectangular cabinet having four sides 2, a bottom 4 and a top or cover plate 6. A lower, tape supply reel 8 and an upper, tape take-up reel 10 are stacked in concentric relationship above the cover plate on a tape supply hub 12 and a tape take-up hub 14 respectively.

Tape 16 travels from the tape supply reel 8, past an idler roller 18, the post 20 of a compliance arm, another idler roller 22, a capstan 24, a head assembly 26, a guide post 28, and a third idler roller 30, and then is wrapped helically around a scanning assembly 32. The details of the scanning assembly and related parts are disclosed in my co-pending application Ser. No. 536,107 filed Mar. 21, 1966, now abandoned. From the scanning assembly, the tape goes past an idler roller 34, another guide post 36, a second head assembly 38, a capstan 40, idler roller 42, the post 44 of another compliance arm and another idler roller 46, and onto the tape take-up reel 10. The tape is elevated as it winds helically on the scanning assembly 32, so the guide post 36 and second head assembly 38 are supported on a small raised deck 48.

As is shown in FIGURE 2, the hubs 12 and 14 are mounted on an elongate stationary housing 50 fixed to the cabinet frame or chassis plate 52. A drive shaft 54, having a pulley 56, on its lower end, extends through a bore 58, in the housing. The shaft 54 is rotatably mounted on upper and lower bearings 60, which are held in position by shoulders in the housing, a removable ring 62, and a snap ring 64. A one-way clutch 66 disposed between the shaft 54 and the housing 50 permits free rotation of the shaft in the counter-clockwise direction but locks the shaft against clockwise rotation.

The one-way clutch 66 will not be described in detail as it is a commercially available item. An example of a suitable clutch is the cup roller clutch sold by the Torrington Company, Bearings Division, Torrington, Connecticut, as their RC or RCB series, and described in their brochure KC 15M 1/65 copyrighted 1964. Briefly, such a clutch has an outer shell which bears on the housing 50 and a plurality of roller bearings, which bear on the shaft 54. When the shaft rotates counterclockwise, the rollers rotate freely. On the other hand, when the shaft attempts to rotate clockwise the rollers are wedged between the shaft and inclined surfaces on the interior of the shell so that the rollers cannot rotate and the shaft is locked against rotation in the clockwise direction. However, the term one-way clutch, as used herein, is not intended to be limited to the use of such a roller type clutch, but includes any clutch which serves the purpose of permitting free rotation of the shaft in one direction and locking the shaft against rotation in the other direction.

The take-up hub 14 is mounted on the upper end of the shaft 54 and is fixed to the shaft by a set screw 68. Three arcuately spaced spring-loaded ball plungers 70 (only one of which is shown) protrude slightly from the periphery of the take-up hub near its bottom 72 to support the take-up tape reel 10. A cap member 76 is rotatably mounted on the take-up hub. Three arcuately spaced dowel pins 74 on the cap member 76 extend over the tape reel 10 to retain it on the hub 14 during normal use. The cap 76 is rotated to align each of the pins 74 with one of three slots 80 in the tape reel so that the reel can be put in place or removed. The cap is then rotated to remove the pins 74 from alignment with the slots 80 to lock the reel on the hub. A key 78 extends outwardly from the hub into one of the slots 80 to rotationally fix the reel to the hub.

The supply hub 12 is rotatably mounted around the stationary 50 by a pair of bearings 82 which are retained in place by the removable ring 62 and shoulders on the supply hub 12 and housing 50. The tape supply reel 8 is supported on an enlarged shoulder 86 near the bottom of the supply hub and is retained on the hub by three arcuately spaced spring-loaded ball plungers 88 (only one of which is shown). A key 90 on the supply hub is engaged in a slot 92 in the supply tape reel to rotationally fix the reel to the hub. The tape supply hub and reel are suitably spaced from the chassis 52, cover plate 6, and take-up hub 14, so that the supply reel 8 and take-up reel 10 are free to rotate independent of each other.

The lower end of the supply hub extends beneath the cover plate and includes a brake drum 94 and a toothed ratchet 96 which will be described in detail later.

Still referring to FIGURE 2 the capstan 40 is mounted on an elongate stationary housing 98 fixed to the chassis plate 52 and extending upward through the cover plate 6. A capstan shaft 100 extends through the bore 102 of the housing and is rotatably mounted on upper and lower bearings 104 which are held in position by opposed snap rings 106 and shoulders on the journal housing. A one-way clutch 108 similar to the one-way clutch 66 used for the hub shaft 54, is engaged between the housing 98 and the shaft 100 to permit free counter-clockwise rotation, but prevent clockwise rotation.

A cylindrical capstan body 110 is mounted on the shaft 100 and is fixed to it by a set screw 112. A large diameter recess 114 in the lower portion of the capstan body receives the housing in spaced relationship. The periphery of the capstan body 110 is covered with a high friction material 116 for engaging and pulling the tape.

The capstan shaft 100 extends below the chassis plate 52 and has a three-sheaved pulley 118 fixed on its lower end. A drive motor 119 mounted on the cabinet bottom 4 has a rotatable drive pulley 120 in alignment with the lower sheave 122 of the capstan pulley. A belt 124 extending around the drive pulley 120 and the lower sheave 122 transmits rotation of the motor 119 to the capstan 40. A second belt 126 extending around the middle sheave 128 and the hub pulley 56 drives the take-up hub 14 counter-clockwise.

The detailed structure of the other capstan assembly 24 is similar to that of the capstan assembly 40 illustrated in FIGURE 2 except that the housing and capstan roller do not extend so far above the cover plate 6 since the tape coming off the supply reel 8 is at a lower elevation. The shaft of the capstan 24 has a single-sheaved pulley (not shown) on its lower end and is operatively connected to the upper sheave 130 of the other capstan shaft 100 for counter-clockwise rotation by a belt 132.

Figure 3:
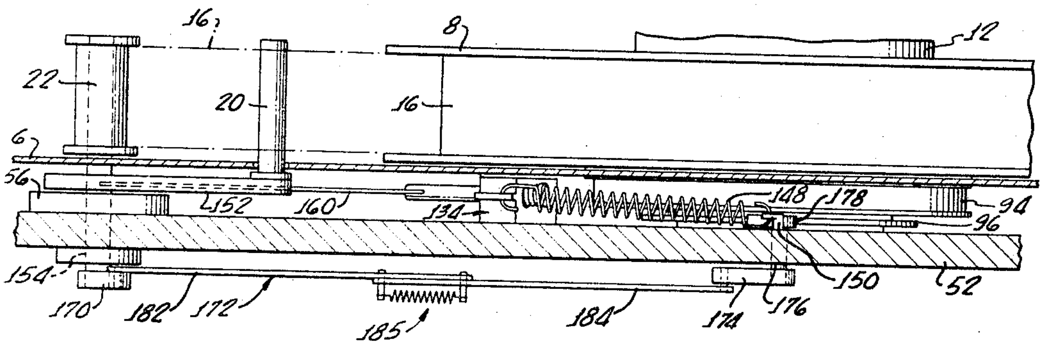
FIGURE 3 is a vertical section taken generally along lines 3—3 of FIGURE 1, illustrating a brake and selectively engageable hub lock, operatively connected to the supply hub, in accordance with this invention.
Figures 4, 5:
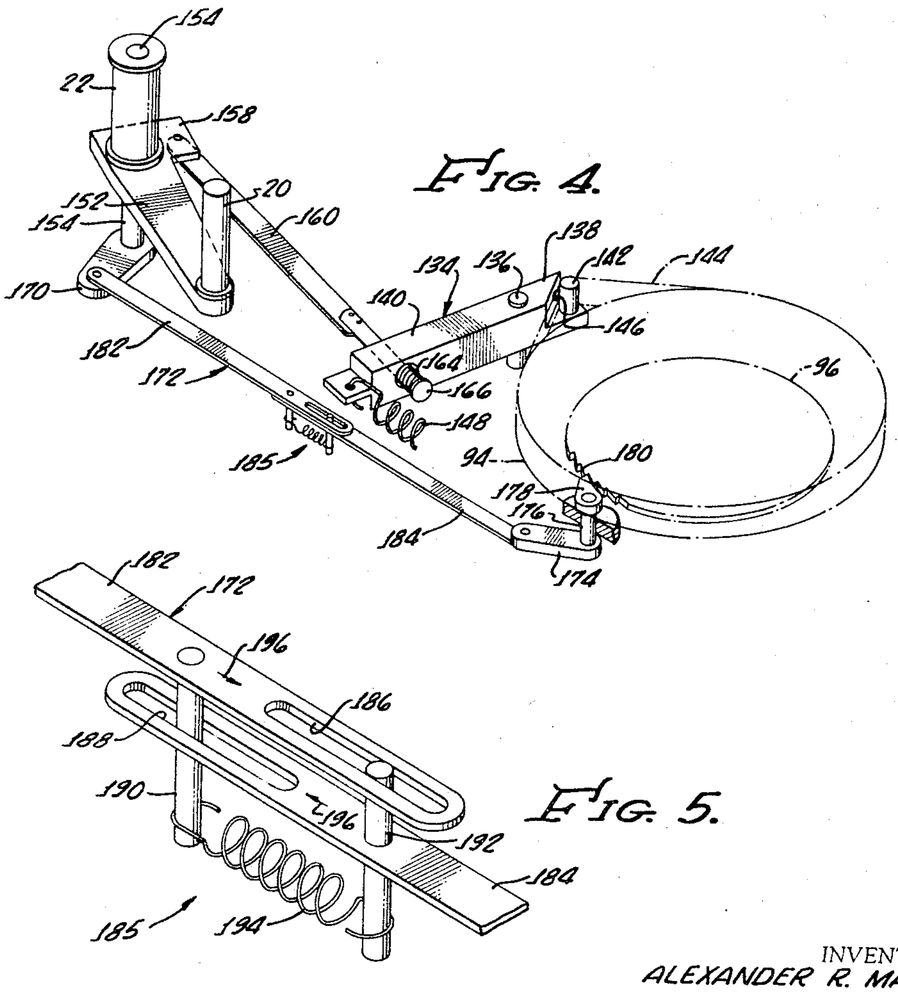
FIGURE 4 is a perspective view of portions of the hub brake and engageable mechanism removed from the cabinet of the tape recorder.
FIGURE 5 is an enlarged perspective view of the extensible joint in the lock-actuating rod.

Referring now to FIGURES 3 and 4, a brake lever 134 mounted on the chassis for pivotal movement about an axis 136 has a short arm 138 adjacent the brake drum 94 of the supply hub and a relatively long arm 140 on the opposite side of the axis 136. A post 142 is mounted on the end of the short arm 138 and a brake band 144 extends around the brake drum 94 and the post 142. The brake band is locked to the post 142 by a set screw 146. A relatively strong tension spring 148 is connected to the long arm 140 of the brake lever and to a lug 150 on the chassis plate. The spring 148 urges the brake lever 134 counter-clockwise to place tension in the brake band 144, so that friction between the stationary band and the brake drum 94 yieldably resists rotation of the supply hub 12. Stainless steel has been found to be a suitable material for the brake drum, and a polyester material such as is currently sold under the trademark Mylar is preferred for the brake band.

Figures 6, 7, 8:
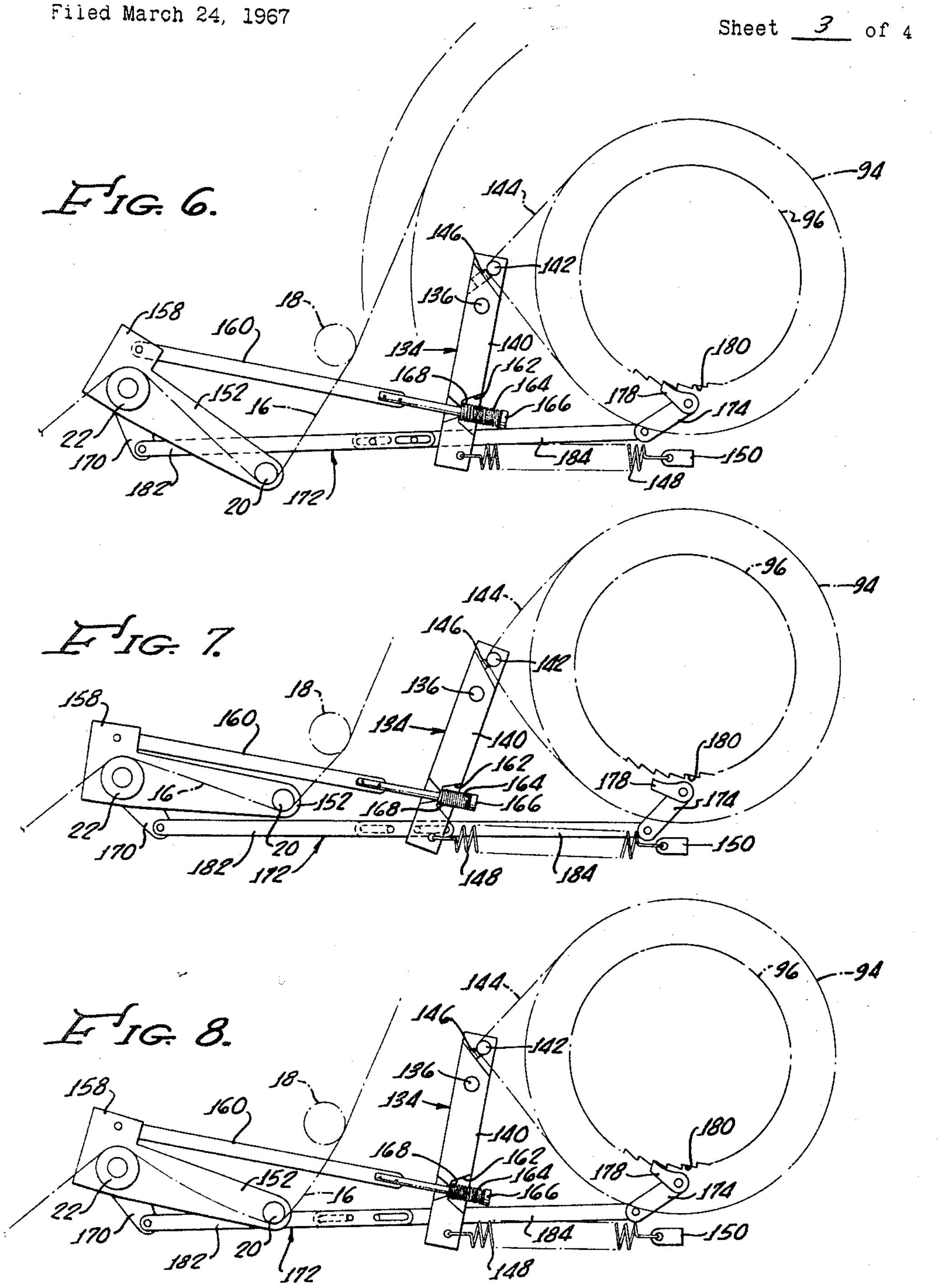
FIGURES 6–8 are plan views of the brake and engageable lock mechanism constructed in accordance with this invention illustrating the mechanism at various operative positions.

Referring to FIGURES 3, 4 and 6, the supply compliance arm 152 is fixed to a short shaft 154 which extends through the chassis plate and is pivotally mounted on the chassis plate by suitable bearings 156. The idler roller 22 is rotatably mounted on the upper end of the shaft 154. A short integral crank arm 158 extends laterally from the compliance arm and is connected to one end of a connecting rod 160. The opposite end of the connecting rod extends freely through a bore 162 in the brake lever 134 intermediate the pivot axis 136 and the spring 148. A compression spring 164 is disposed around the protruding end of the connecting rod and is engaged between an enlarged head 166 on the end of the rod and an internal shoulder 168 in the braking lever bore 162. The compression spring 164 is considerably weaker than the tension spring 148.

A lock-actuating arm 170 is fixed on the lower end of the shaft 154 to pivot with the compliance arm. A long lock-actuating rod 172 is connected to the arm 170 and to the crank 174 of a selectively engageable locking assembly. The crank 174 is fixed to a pivotally-mounted shaft 176 and a pawl 178 is also fixed to the shaft. The pawl engages the teeth 180 of the ratchet 96 when the pawl is pivoted clockwise, and releases the ratchet when the pawl is pivoted counter-clockwise. When the pawl 178 is engaged, the supply hub 12 is locked against counterclockwise rotation, i.e., against forward tape movement.

As is shown in FIGURE 5, as well as in FIGURES 3 and 4, the lock-actuating rod 172 includes two separate members 182 adn 184 which overlap in a joint 185 at the center. Each of the overlapped portions includes an elongate slot 186 and 188, respectively. A pin 190 fixed on the upper rod member 182 extends down through the slot 188 in the lower rod member 184, and a pin 192 fixed on the lower rod member extends up through the slot 186 in the upper rod member. Thus, the pins 190 and 192 and slots 186 and 188 form an extensible joint permitting elongation and shortening of the lock-actuating rod. A tension spring 194 connected between lower extensions of the pins 190 and 192 urges the two rod members 182 and 184 in the direction of the arrows 196 thereby urging the rod to its shortened position. The tension spring 194 is considerably weaker than both the tension spring 148 and the compression spring 164.

Referring now to FIGURES 1 and 7, with the tape transport mechanism operating in a normal manner, the capstans 24 and 40 and the take-up reel are rotated counter-clockwise to pull tape off the supply reel. The supply compliance arm post 20 engages the tape 16 coming off the supply reel 8 and assumes, for example, about the position illustrated in FIGURE 7. In that position, the lock-actuating arm 170 is pivoted sufficiently counter-clockwise to hold the pawl 178 disengaged from the ratchet 96 so that the supply hub 12, is unlocked. In this operating position, the spring 194 (see FIGURE 5) holds the lock-actuating rod 172 in the shortened position, but the length of the shortened rod is sufficient to hold the pawl out of engagement when the compliance arm 152 is in the position illustrated in FIGURE 7. The connecting rod 160 is pulled sufficiently far to the left in FIGURE 7 that the intermediate strength spring 164 is bottomed out of fully compressed between the head 166 and the shoulder 168. The stronger spring 148 urges the brake lever 134 counter-clockwise to maintain tension in the brake band 144 and, through the connecting rod 160, urges the compliance arm clockwise against the tape 16.

If the tape adjacent the compliance arm post 20 slackens slightly because the supply reel is rotating too fast in relation to the capstan 24, the large spring 148 pulls the brake lever 134 and connecting rod 160 to the right in FIGURE 7 thereby rotating the compliance arm clockwise to take up the slack in the tape. At the same time, the counter-clockwise pivoting of the brake lever about its axis 136 increases the tension in the brake band 144 thereby increasing its braking force and slowing rotation of the supply reel so that the tape will tighten up. As the tape tightens, the elements return to about the position illustrated in FIGURE 7.

On the other hand, if the tape tightens slightly from the position illustrated in FIGURE 7 because the supply reel is rotating too slow in relation to the capstan 24, the tape pulls the compliance arm counter-clockwise and through the connecting rod 160 pulls the brake lever 134 clockwise against the urging of the large spring 148 to relieve tension in the brake band and reduce the braking force. This permits the supply reel to speed up and relieve the tension in the tape so that the compliance arm comes back to about the normal position illustrated in FIGURE 7. Throughout this normal operation, the intermediate compression spring 164 is bottomed-out and the larger spring 148 is in control so that the compliance arm 152, braking lever 134, and connecting rod 160 move as a unit. Also, the pivoting of the compliance arm in this normal operation is not sufficient to cause the pawl to engage the ratchet.

If the drive motor 119, is deactivated, the capstans 24 and 40, take-up hub 14 and reel 10, and supply hub 12 and reel 8 stop rotating. If, for example, under vibration, the supply hub 12 and reel 8 then migrate counter-clockwise without rotation of the capstan 24, the tape slackens and the compliance arm 152 pivots clockwise to take up the slack. Eventually the migration may be sufficient to cause the compliance arm to assume the position illustrated in FIGURE 8 in which the lock-actuating arm 170 has shifted the lock-actuating rod 172 to the right and pivoted the pawl 178 clockwise far enough that it engages the rachet teeth 180 and positively locks the supply hub 12 against further movement in the forward or tape supply direction.

The major part of this clockwise rotation of the compliance arm and lock-actuating arm is caused by the large spring 148 contracting to pivot the brake lever 134 counter-clockwise and, through the bottomed-out intermediate spring 164 to pull the connecting rod 160 to the right. Before the compliance arm has pivoted to the position of FIGURE 8, however, the braking lever 134 stops pivoting because the tension in the brake band 144 has become sufficient to balance off the maximum torque caused by the large spring 148. At this point, the intermediate strength compression spring 164 begins to expand and urges the connecting rod 160 further to the right, thus pivoting the compliance arm further clockwise to the position illustrated in FIGURE 8.

In the engaged or locked position no additional slack in the tape should occur since both the capstans 24 and 40, and the take-up hub 14 and reel 10, are prevented from backing up even under extreme vibrational conditions by the one-way clutches 66 and 108, and the supply reel 8 is locked against rotation in the forward direction by the ratchet 96 and pawl 178. Even if some further slackening of the tape should occur, however, the compliance arm 152 is able to move toward the position illustrated in FIGURE 6 to take up slack by extending the joint 185 and expanding the relatively weak spring 194 under the urging of the intermediate strength spring 164. If the supply reel backs-up under vibrational loads, the compliance arm 152 is able to relieve the tape tension by pivoting counter-clockwise.

Upon a sharp tightening or increase in the tension of the tape such as occurs when the motor is started again to drive the capstans and take-up reel forward, the compliance arm 152 is pulled counter-clockwise back to the postion illustrated in FIGURE 7 or beyond, thereby throwing the lock actuating rod 172 to the right and releasing the pawl from the ratchet so that the tape transport mechanism is free to operate in its normal operating mode.

While the above embodiment has been described as operating only in one direction, it should be understood that a reverse or rewind mode of operation could be added by removing the one-way clutches and substituting a selectively engageable locking mechanism on the take-up reel operated off the compliance arm 44.

Moreover, it should be understood that a servo mechanism interconnecting the two compliance arms, such as is known in the prior art, can be used with the apparatus of this invention to provide closer tape tension control in normal operation.

Figure 9:
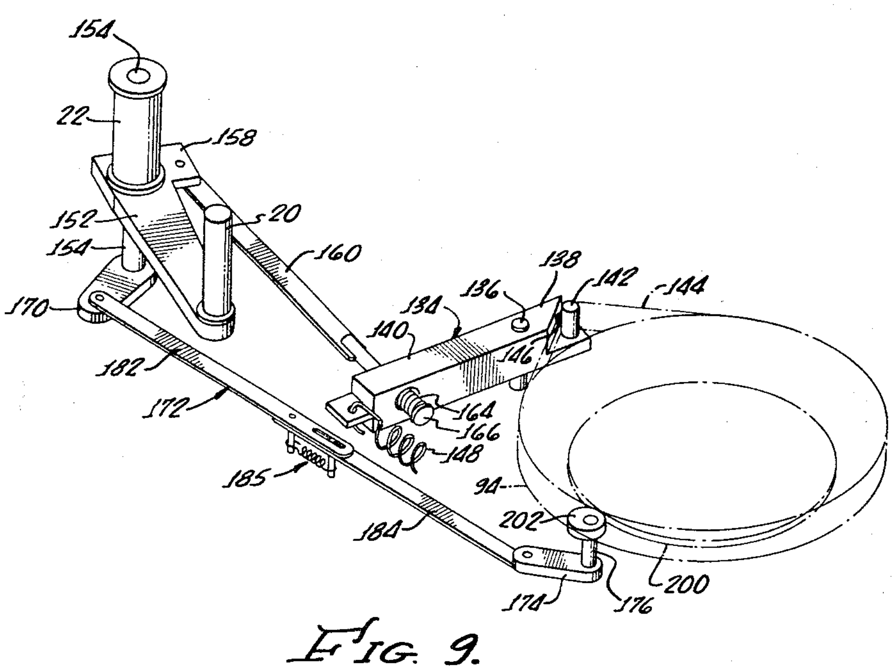
FIGURE 9 is a perspective view of a modified embodiment of a brake and engageable lock mechanism constructed in accordance with this invention.

The modified embodiment illustrated in FIGURE 9 is similar to that of FIGURES 1–8 except that a disk 200 having a high friction surface is substituted for the toothed ratchet and a locking wedge 202 eccentrically mounted on the shaft 176 is substituted for the pawl. The operation of the embodiment of FIGURE 9 differs from the operation of the embodiment described above only in that locking is achieved by engagement between the high friction surface of the disk 200 and a high friction surface on the wedge 202. Thus, as the compliance arm 152 pivots clockwise beyond its normal operating sector, the lock-actuating arm 170 pulls the lock-actuating rod 172 to the left in FIGURE 9 and pivots the crank 174 and the wedge 202 about the axis of the shaft 176 to engage the wedge against the disk and lock the disk and, therefore, the supply hub against counter-clockwise rotation.

The lock illustrated in FIGURE 9 is self-energizing since any counter-clockwise rotation of the disk after the lock is engaged increases the locking force between the wedge and the disk.

While this invention has been described with particular reference to the illustrated embodiments, it should be understood that those embodiments are illustrative only, and the scope of this invention should not be limited except in accordance with the following claims.

I claim:

1. Tape transport apparatus comprising:
- a frame;
- a supply hub adapted to receive a first tape reel, said hub being mounted on the frame for rotation in a forward direction to feed tape from the reel;
- a take-up hub adapted to receive a second tape reel, said hub being mounted on the frame for rotation in a forward direction to receive tape fed from the supply reel;
- lock means preventing the take-up hub from rotating in the reverse direction;
- selectively engageable means for locking the supply hub against rotation in its forward direction; and
- means responsive to a pre-selected amount of slack in the tape intermediate the first and second tape reels for engaging said selectively engageable means.

2. Tape transport apparatus comprising:
- a frame;
- a supply hub rotatably mounted on the frame and adapted to receive a first tape reel;
- a take-up hub rotatably mounted on the frame and adapted to receive a second tape reel;
- a capstan rotatably mounted on the frame and having a peripheral surface of relatively high friction material for engaging the tape intermediate the first and second reels;
- motor means for rotating the capstan and the take-up hub in one direction to pull tape from the first reel past the capstan and onto the second reel;
- one-way clutch means locking the take-up hub against rotation in the direction opposite said one direction;
- tape compliance means moved in response to variations in tension in the tape intermediate the first reel and the capstan;
- selectively engageable means for locking the supply hub against rotation in the tape supplying direction; and
- means for engaging said selective engageable means responsive to the compliance means moving a pre-selected distance in response to decrease in tape tension.

3. Tape transport apparatus comprising:
- a frame;
- a supply hub rotatably mounted on the frame and adapted to receive a tape supply reel;
- a motor operated capstan rotatably mounted on the frame for pulling tape from the supply reel causing the supply hub to rotate in the forward, tape feeding direction;
- a compliance arm mounted on the frame for movement to take up slack in the tape between the supply reel and the capstan;
- brake means for yieldably resisting rotation of the supply hub;
- means operably connecting the compliance arm to the brake means to increase the braking force in response to slackening of the tape and decrease the braking force in response to tightening of the tape;
- selectively engageable means for locking the supply hub against rotation in the tape supply direction; and
- means operably connecting the compliance arm to the selectively engageable locking means for engaging said locking means responsive to a pre-selected amount of slack in the tape between the supply reel and the capstan.

4. Tape transport apparatus in accordance with claim 3 wherein the means operably connecting said compliance arm to the locking means includes means permitting the compliance arm to move to take up further slack in the tape between the supply reel and capstan after the locking means is engaged.

5. Tape transport apparatus in accordance with claim 3 wherein the means operably connecting the compliance arm to the brake means includes means permitting the compliance arm to move to take up further slack in the tape between the supply reel and capstan after the brake means has reached the limit of its movement.

6. Tape transport apparatus in accordance with claim 3 wherein the selectively engageable locking means comprises:
- a toothed ratchet fixed to the supply hub; and
- a pawl mounted on the frame and operably connected to the compliance arm for selective locking engagement with the ratchet responsive to movement of the compliance arm.

7. Tape transport apparatus in accordance with claim 3 wherein the selectively engageable locking means comprises:
- a circular high friction surface fixed to the supply hub; and
- a high friction locking member mounted on the frame and operably connected to the compliance arm for selective locking engagement with the high friction surface responsive to movement of the compliance arm.

8. Tape transport apparatus in accordance with claim 3 wherein:
- the compliance arm is mounted for pivotal movement on the frame;
- the selectively engageable locking means is mounted on the frame for pivotal movement between an engaged position and a disengaged position; and
- the means operably connecting the compliance arm to the locking means includes means for pivoting the locking means responsive to pivoting of the compliance arm.

9. Tape transport apparatus in accordance with claim 8 wherein the means for pivoting the locking means responsive to pivoting of the compliance arm comprises:
- an elongate actuating member connected between the compliance arm and the lockng means;
- an extensible joint in the elongate actuating member; and
- spring means urging the extensible joint toward its contracted position.

10. Tape transport apparatus in accordance with claim 8 wherein the means operably connecting the compliance arm to the brake means comprises:
- a lever pivotally mounted on the frame intermediate the ends of the lever to define first and second lever arms on opposite sides of the pivot;
- means on the first lever arm for applying force to the brake means;
- means connecting the second lever arm to the compliance arm for pivoting the lever responsive to pivoting of the compliance arm; and
- spring means urging the lever in the direction which applies braking force to the brake means.

11. Tape transport apparatus in accordance with claim 10 wherein the means connecting the second lever arm to the compliance arm comprises:
- a crank arm fixed to the compliance arm;
- an elongate rod connected to the crank arm and extending through a bore in the second lever arm;
- means retaining the elongate rod in the bore; and
- spring means urging the elongate rod through the bore.

12. Tape transport apparatus in accordance with claim 3 and further comprising:

spring means applying braking force to the brake means and urging the compliance arm to take up tape slack;

spring means in the means connecting the compliance arm to the brake means permitting movement of the compliance arm to take up tape slack after the brake means has fully engaged; and spring means in the means connecting the compliance arm to the locking means permitting movement of the compliance arm to take up tape slack after the locking means has engaged.

13. Tape transport apparatus in accordance with claim 12 wherein:

the spring means in the means connecting the compliance arm to the brake means is stronger than the spring means in the means connecting the compliance arm to the locking means and weaker than the spring means applying braking force to the brake means.

14. Tape transport apparatus in accordance with claim 3 comprising:

a take-up hub rotatably mounted on the frame and adapted to receive a tape take-up reel;

motor means for rotating the take-up hub in the forward, tape-receiving direction; and a one-way clutch locking the take-up reel against rotation in its reverse direction.

15. Tape transport apparatus in accordance with claim 14 and further comprising a one-way clutch locking the capstan against rotation in the reverse direction.

16. A tape transport for a magnetic tape recorder comprising:

a frame;

a tape supply reel mounted on the frame for rotation in a forward direction to give up tape;

a take-up reel mounted on the frame for rotation in a forward direction to take-up tape;

a tape drive capstan mounted for rotation in a forward direction to drive tape from the supply reel toward the take-up reel;

a one-way lock permitting the take-up reel to rotate in the forward direction and locking the take-up reel against rotation in the reverse direction; and a tension responsive lock preventing the supply reel from rotating in the forward direction until a predetermined tape tension is present.

17. Tape transport apparatus in accordance with claim 16 and further comprising a one-way lock permitting the capstan to rotate in the forward direction and locking the capstan against rotation in the reverse direction.

18. Tape transport apparatus in accordance with claim 16 wherein said tension responsive lock comprises:

selectively engageable means for locking the supply reel against rotation in the forward direction while permitting rotation in the reverse direction;

means for engaging said selectively engageable means responsive to slack in the tape portion intermediate the supply reel and the capstan in excess of a preselected amount; and means for releasing said selectively engageable means responsive to tension in the tape portion between the supply reel and the capstan in excess of a preselected amount.

References Cited

UNITED STATES PATENTS

| | | | |
|---|---|---|---|
| 248,261 | 10/1881 | Hubbard | 242—156.2 |
| 756,751 | 4/1904 | Wallace | 242—156 |
| 2,948,488 | 8/1960 | Schoebel et al. | 242—75.43 |

GEORGE F. MAUTZ, *Primary Examiner.*

U.S. Cl. X.R.

242—75.43, 156.2